(12) United States Patent
Chatterjee et al.

(10) Patent No.: US 8,127,096 B1
(45) Date of Patent: Feb. 28, 2012

(54) HIGH CAPACITY THIN PROVISIONED STORAGE SERVER WITH ADVANCED SNAPSHOT MECHANISM

(75) Inventors: Paresh Chatterjee, Fremont, CA (US);
Vijayarankan Muthirisavengopal, Fremont, CA (US); Narayanan Balakrishnan, Milpitas, CA (US);
Loganathan Ranganathan, Fremont, CA (US)

(73) Assignee: American Megatrends, Inc., Norcross, GA (US)

( * ) Notice: Subject to any disclaimer, the term of this patent is extended or adjusted under 35 U.S.C. 154(b) by 801 days.

(21) Appl. No.: 12/173,212

(22) Filed: Jul. 15, 2008

Related U.S. Application Data

(60) Provisional application No. 60/950,664, filed on Jul. 19, 2007.

(51) Int. Cl.
*G06F 12/00* (2006.01)
(52) U.S. Cl. ......... 711/162; 711/206; 711/220; 711/221
(58) Field of Classification Search .................. None
See application file for complete search history.

(56) References Cited

U.S. PATENT DOCUMENTS

| | | | |
|---|---|---|---|
| 4,569,018 A * | 2/1986 | Hummel et al. | ............... 711/207 |
| 4,942,579 A | 7/1990 | Goodlander et al. | |
| 5,257,367 A | 10/1993 | Goodlander et al. | |
| 5,530,850 A | 6/1996 | Ford et al. | |
| 5,720,027 A | 2/1998 | Sarkozy et al. | |
| 5,732,238 A | 3/1998 | Sarkozy | |
| 5,787,459 A | 7/1998 | Stallmo et al. | |
| 5,790,774 A | 8/1998 | Sarkozy | |
| 5,893,919 A | 4/1999 | Sarkozy et al. | |
| 5,974,426 A | 10/1999 | Lee et al. | |
| 6,098,128 A | 8/2000 | Velez-McCaskey et al. | |
| 6,298,425 B1 | 10/2001 | Whitaker et al. | |
| 6,327,638 B1 | 12/2001 | Kirby | |
| 6,434,681 B1 | 8/2002 | Armangau | |
| 6,460,054 B1 | 10/2002 | Grummon | |
| 6,484,235 B1 | 11/2002 | Horst et al. | |
| 6,718,436 B2 | 4/2004 | Kim et al. | |
| 6,892,211 B2 | 5/2005 | Hitz et al. | |
| 6,901,479 B2 | 5/2005 | Tomita | |

(Continued)

OTHER PUBLICATIONS

U.S. Appl. No. 12/425,123, filed Apr. 16, 2009 entitled "Provisioning Space in a Data Storage System", Inventors: Chatterjee et al.

(Continued)

*Primary Examiner* — Reginald Bragdon
*Assistant Examiner* — Baboucarr Faal
(74) *Attorney, Agent, or Firm* — McKeon, Meunier, Carlin & Curfman, LLC

(57) ABSTRACT

Technologies for high capacity storage servers with thin provisioning can support an increased storage capacity and an increased number of snapshots within a data storage system while maintaining a reduced memory footprint. Flexible virtual address translation can support both direct, and indirect, translation from a virtual address to an address in physical storage. A data structure, referred to as a volume table, may be provided for supporting the virtual to physical address translation. Multiple volume tables for the various volumes within a data storage system can be stored together in a global volume table. Granularities of storage allocation units, such as territories, provisions, and chunks can be reduced to improve efficiencies in the operation of the storage system. Processes for handling volume and snapshot I/O operations with various data structures can contribute to improved efficiencies while supporting increased storage capacities and an increased number of snapshots.

20 Claims, 9 Drawing Sheets

U.S. PATENT DOCUMENTS

| | | | |
|---|---|---|---|
| 7,072,916 | B1 | 7/2006 | Lewis et al. |
| 7,111,026 | B2 | 9/2006 | Sato |
| 7,373,366 | B1 | 5/2008 | Chatterjee et al. |
| 7,536,529 | B1 | 5/2009 | Chatterjee et al. |
| 2002/0161983 | A1 | 10/2002 | Milos et al. |
| 2003/0163630 | A1 | 8/2003 | Aasheim et al. |
| 2004/0030727 | A1 | 2/2004 | Armangau et al. |
| 2004/0128470 | A1 | 7/2004 | Hetzler et al. |
| 2006/0218364 | A1 | 9/2006 | Kitamura |
| 2008/0229048 | A1* | 9/2008 | Murase et al. ............... 711/171 |

OTHER PUBLICATIONS

U.S. Official Action dated Mar. 30, 2009 in U.S. Appl. No. 11/417,801.

U.S. Official Action dated Jul. 8, 2009 in U.S. Appl. No. 11/417,801.

U.S. Notice of Allowance / Allowability dated Jan. 12, 2009 in U.S. Appl. No. 11/254,347.

U.S. 6,988,220, 01/2006, Eng et al. (withdrawn).

U.S. Appl. No. 11/254,347, filed Oct. 20, 2005 entitled "Method, System, Apparatus, and Computer-Readable Medium for Provisioning Space in a Data Storage System," Inventors: Chatterjee et al.

U.S. Official Action dated Sep. 4, 2007 in U.S. Appl. No. 11/254,347.

U.S. Official Action dated Mar. 18, 2008 in U.S. Appl. No. 11/254,347.

U.S. Appl. No. 11/255,146, filed Oct. 20, 2005, entitled Method, System, Apparatus, and Computer-Readable Medium for Taking and Managing Snapshots of a Storage Volume, Inventors: Chatterjee et al.

U.S. Official Action dated Aug. 4, 2006 in U.S. Appl. No. 11/255,146.

U.S. Official Action dated Nov. 17, 2006 in U.S. Appl. No. 11/255,146.

U.S. Official Action dated Aug. 22, 2007 in U.S. Appl. No. 11/255,146.

U.S. Notice of Allowance / Allowability dated Dec. 11, 2007 in U.S. Appl. No. 11/255,146.

U.S. Appl. No. 12/042,705, filed Mar. 5, 2008 entitled "Method, System, Apparatus, and Computer-Readable Medium for Taking and Managing Snapshots of a Storage Volume," Inventors: Chatterjee et al.

U.S. Appl. No. 12/042,710, filed Mar. 5, 2008 entitled "Method, System, Apparatus, and Computer-Readable Medium for Taking and Managing Snapshots of a Storage Volume," Inventors: Chatterjee et al.

U.S. Appl. No. 12/042,715, filed Mar. 5, 2008 entitled "Method, System, Apparatus, and Computer-Readable Medium for Taking and Managing Snapshots of a Storage Volume," Inventors: Chatterjee et al.

U.S. Appl. No. 11/417,801, filed May 4, 2006 entitled "Method, System, and Apparatus for Expanding Storage Capacity in a Data Storage System," Inventors: Chatterjee et al.

Douglis et al., "Log-Structured File Systems," IEEE, 1989, pp. 124-129.

Green et al., "Designing a Fast, On-line Backup System for a Log-Structured File System," Digital Technical Journal, vol. 8, No. 2, 1996, pp. 32-45.

Peterson et al. "Ext3cow: A Time-Shifting File System for Regulatory Compliance," ACM Transactions on Storage, vol. 1, No. 2, May 2005, pp. 190-212.

Rosenblum et al., "The Design and Implementation of a Log-Structured File System," ACM Transactions on Computer Systems, vol. 10, No. 1, Feb. 1992, pp. 26-52.

U.S. Official Action dated Oct. 8, 2008 in U.S. Appl. No. 11/254,347.

* cited by examiner

HIGH CAPACITY THIN PROVISIONED STORAGE SERVER WITH ADVANCED SNAPSHOT MECHANISM

CROSS-REFERENCE TO RELATED APPLICATION

This application claims the benefit of U.S. provisional patent application No. 60/950,664, filed on Jul. 19, 2007, entitled "A Novel Method of Implementing Low-Footprint High Capacity Thin Provisioned Storage Server with Advanced Snapshots Mechanism," which is expressly incorporated herein by reference in its entirety.

BACKGROUND

Enterprise information systems typically utilize large-scale storage systems to provide data storage facilities to employees, vendors, customers, or other users. Due to the massive scale of such systems, the task of administering a large-scale storage system can be challenging. In particular, system administrators responsible for large-scale storage systems perform a number of tasks, such as partitioning of the storage system into multiple volumes to support the users and applications of the system. However, determining the amount of storage space to be allocated to each volume is complicated since an administrator cannot know, in advance, how much space will be utilized by each storage volume over a long period of time. An incorrect allocation of space may lead to the starving of some volumes for space, requiring the addition of new capacity to the volumes, while other volumes go underutilized. Traditionally, the underutilized volumes cannot be easily reassigned to volumes needing additional storage space.

A thin provisioning solution can assist storage administrators in the allocation of storage capacity. A thin provisioning system can support creating storage volumes irrespective of the amount of physical capacity actually present. This can reduce the amount of system capacity purchased at the initial deployment time of the system. Thin provisioning can also relieve an administrator from figuring out an exact allocation of storage pools at design or deployment time. Instead, an administrator can make an arbitrary thin provisioning of the virtual storage space among all of the applications to start. Later, actual physical capacity behind the storage system can be added as appropriate.

Storage administrators are also usually responsible for making frequent data backups to be used at times of disaster or other data loss. Snapshots have become a preferred method of protecting a data storage volume against inadvertent data loss and for performing background backups. A read-only snapshot is a non-writable volume that is a point-in-time image of a data storage volume that can be created, mounted, deleted, and rolled back onto the data storage volume arbitrarily. Such snapshots are utilized extensively in the data storage industry for security, backup, and archival purposes. A writeable snapshot is initially an image of a read-only parent snapshot. The writeable snapshot may be written to and modified without affecting the read-only parent snapshot.

Both thin provisioning and snapshot management, within a data storage system, generally use various tables or data structures to store details related to the storage provisioning and snapshots. The size and access-complexity of these tables or data structures can limit the capacity of, or reduce the performance of, a data storage system. This can be particularly true as storage capacities become very large or the number of snapshots increases.

It is with respect to these considerations and others that the disclosure made herein is presented.

SUMMARY

Technologies are described herein for supporting high capacity storage servers that provide thin provisioning and snapshots while using a reduced memory footprint. The associated technologies for tracking territories, provisions, and chunks within a storage system can support an increased storage capacity and an increased number of snapshots within a data storage system.

According to one embodiment, flexible virtual address translation can support direct translation from a virtual address to an address in physical storage. The flexible virtual address translation can also support indirect translation from a virtual address through an intermediate structure and from the intermediate structure to an address in physical storage. The intermediate structure can provide provision tracking and support snapshot provisions. Both read-only and writeable snapshots may be supported. A data structure, referred to as a volume table, may be provided for supporting the virtual to physical address translation. In the instance where address mapping is direct, a simplified provision tracking function can be provided within the volume table.

According to another embodiment, volume tables associated with the various volumes within a data storage system can be stored together in a global volume table. A global volume table header can serve as an index of volume tables within the global volume table. An entry in the global volume table header can be associated with a single volume table and specify the size of the volume table as well as the offset of the volume table within the global volume table.

According to yet another embodiment, granularities of the territories, provisions, and chunks within a data storage system can be reduced to improve efficiencies in the operation of the storage system and reduce storage space waste. Processes for handling volume and snapshot I/O operations using the various data structures discussed herein may also contribute to improved efficiencies while supporting increased storage capacities and an increased number of snapshots.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
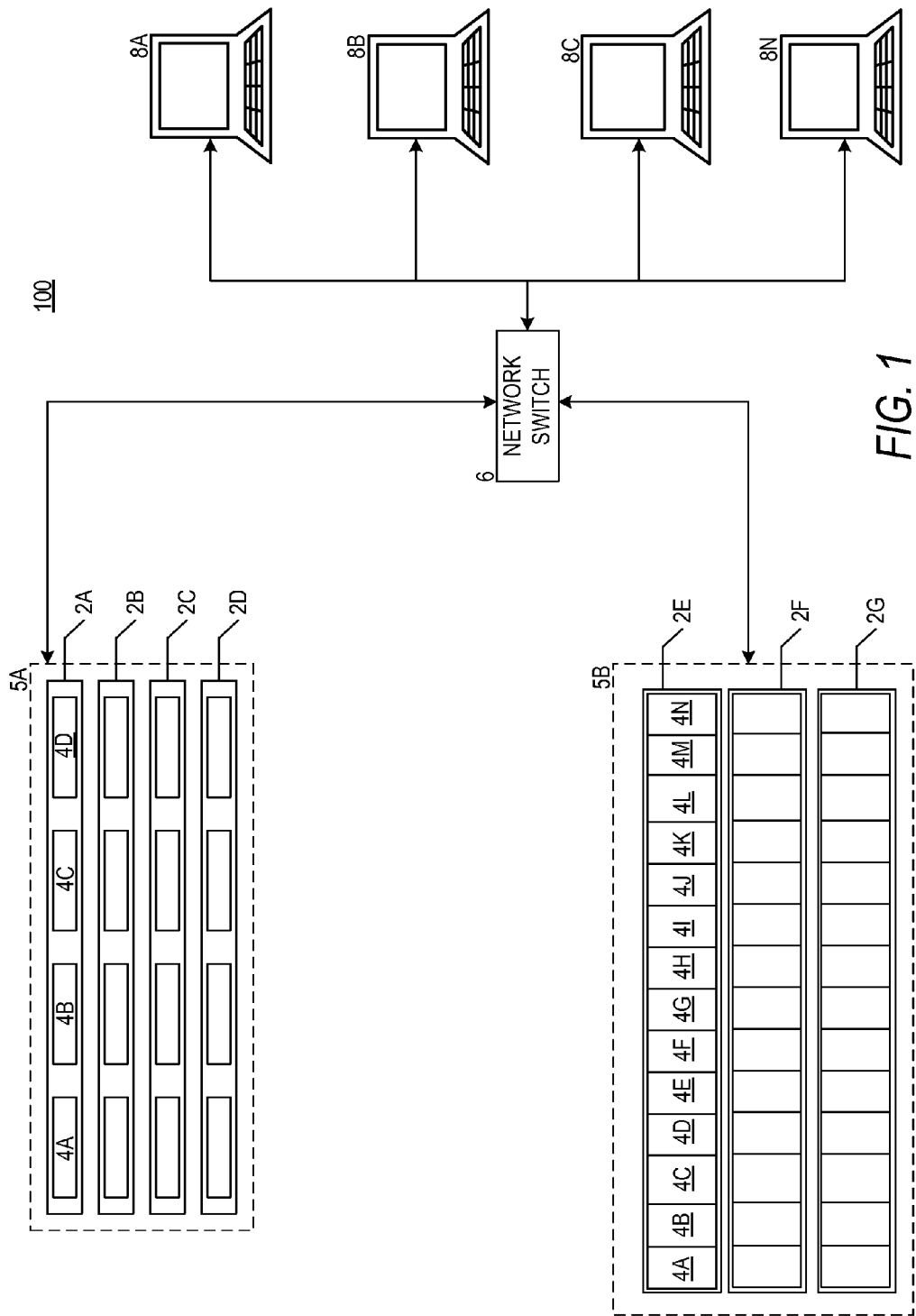
FIG. 1 is a network architecture diagram illustrating aspects of a storage system according to one exemplary embodiment.

The following detailed description is directed to technologies for providing large capacity storage servers that can support thin provisioning and snapshots while maintaining a reduced memory footprint. Through the use of the embodiments presented herein, technologies for tracking territories, provisions, and chunks within a storage system can support an increased storage capacity and an increased number of snapshots. A thin provisioning storage system can use various tables or data structures to store details related to the various storage provisioning elements and snapshots. The tables may be maintained within the main memory of the storage system to support quick access during I/O operations. As a storage system approaches several terabytes (TB) in capacity, efficient management of these tables can reduce operating delays and memory overruns. Technology presented herein can support increased storage capacities efficiently. For example, up to 256 TB, or more, or storage capacity may be supported. Additionally, thousands of snapshots may be supported within a storage system.

Technologies presented herein relate to U.S. patent application Ser. No. 11/254,347, filed on Oct. 20, 2005, and entitled "Method, System, Apparatus, and Computer-Readable Medium for Provisioning Space in a Data Storage System," and to U.S. Pat. No. 7,373,366 entitled "Method, System, Apparatus, and Computer-Readable Medium for Taking and Managing Snapshots of a Storage Volume" both of which are expressly incorporated herein by reference in their entirety.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for large capacity storage servers with thin provisioning, snapshots, and reduced memory footprints will be described.

Turning now to FIG. 1, details will be provided regarding an illustrative operating environment for the implementations presented herein, as well as aspects of several software components that provide the functionality described herein for continuous data protection. In particular, FIG. 1 is a network architecture diagram showing aspects of a storage system 100 that includes several virtualized clusters 5A-5B. A virtualized cluster is a cluster of different storage nodes that together expose a single storage device. In the example storage system 100 shown in FIG. 1, the clusters 5A-5B (collectively, clusters 5) include storage server computers 2A-2G (also referred to herein as "storage nodes" or a "node", collectively nodes 2) that are operative to read and write data to one or more mass storage devices, such as hard disk drives. The cluster 5A includes the nodes 2A-2D and the cluster 5B includes the nodes 2E-2G. All of the nodes 2 in a cluster 5 can be physically housed in the same rack, located in the same building, or distributed over geographically diverse locations, such as various buildings, cities, or countries.

According to implementations, the nodes within a cluster may be housed in a one rack space unit storing up to four hard disk drives. For instance, the node 2A is a one rack space computing system that includes four hard disk drives 4A-4D (collectively, disks 4). Alternatively, each node may be housed in a three rack space unit storing up to fifteen hard disk drives. For instance, the node 2E includes fourteen hard disk drives 4A-4N. Other types of enclosures may also be utilized that occupy more or fewer rack units and that store fewer or more hard disk drives. In this regard, it should be appreciated that the type of storage enclosure and number of hard disk drives utilized is not generally significant to the implementation of the embodiments described herein. Any type of storage enclosure and virtually any number of hard disk devices or other types of mass storage devices may be utilized.

As shown in FIG. 1, multiple storage nodes may be configured together as a virtualized storage cluster. For instance, the nodes 2A-2D have been configured as a storage cluster 5A and the nodes 2E-2G have been configured as a storage cluster 5B. In this configuration, each of the storage nodes 2A-2G is utilized to handle I/O operations independently, but are exposed to the initiator of the I/O operation as a single device. It should be appreciated that a storage cluster may include any number of storage nodes. A virtualized cluster in which each node contains an independent processing unit, and in which each node can field I/Os independently (and route them according to the cluster layout) is called a horizontally virtualized or peer cluster. A cluster in which each node provides storage, but the processing and mapping is done completely or primarily in a single node, is called a vertically virtualized cluster.

Data may be striped across the nodes of each storage cluster. For instance, the cluster 5A may stripe data across the storage nodes 2A, 2B, 2C, and 2D. The cluster 5B may similarly stripe data across the storage nodes 2E, 2F, and 2G. Striping data across nodes generally ensures that different I/O operations are fielded by different nodes, thereby utilizing all of the nodes simultaneously, and that the same I/O operation is not split between multiple nodes. Striping the data in this manner provides a boost to random I/O performance without decreasing sequential I/O performance.

According to embodiments, each storage server computer 2A-2G includes one or more network ports operatively connected to a network switch 6 using appropriate network cabling. It should be appreciated that, according to embodiments of the invention, Ethernet or Gigabit Ethernet may be utilized. However, it should also be appreciated that other types of suitable physical connections may be utilized to form a network of which each storage server computer 2A-2G is a part. Through the use of the network ports and other appropriate network cabling and equipment, each node within a cluster is communicatively connected to the other nodes within the cluster. Many different types and number of connections may be made between the nodes of each cluster. Furthermore, each of the storage server computers 2A-2G need not be connected to the same switch 6. The storage server computers 2A-2G can be interconnected by any type of network or communication links, such as a LAN, a WAN, a MAN, a fiber ring, a fiber star, wireless, optical, satellite, or any other network technology, topology, protocol, or combination thereof.

Each cluster 5A-5B is also connected to a network switch 6. The network switch 6 is connected to one or more client computers 8A-8N (also referred to herein as "initiators"). It should be appreciated that other types of networking topologies may be utilized to interconnect the clients and the clusters 5A-5B. It should also be appreciated that the initiators 8A-8N may be connected to the same local area network ("LAN") as the clusters 5A-5B or may be connected to the clusters 5A-5B via a distributed wide area network, such as the Internet. An appropriate protocol, such as the Internet Small Computer Systems Interface ("iSCSI") protocol may be utilized to enable the initiators 8A-8D to communicate with and utilize the various functions of the storage clusters 5A-5B over a wide area network such as the Internet.

Two or more disks 4 within each cluster 5A-5B or across clusters 5A-5B may be mirrored for data redundancy and protection against failure of one, or more, of the disks 4. Examples of the disks 4 may include hard drives, spinning disks, stationary media, non-volatile memories, or optically scanned media; each, or in combination, employing magnetic, capacitive, optical, semiconductor, electrical, quantum, dynamic, static, or any other data storage technology. The disks 4 may use IDE, ATA, SATA, PATA, SCSI, USB, PCI, Firewire, or any other bus, link, connection, protocol, network, controller, or combination thereof for I/O transfers.

Storage volume snapshots and continuous data protection features may be provided on one or more storage server computers 2A-2G, one or more storage clusters 5A-5B, or one or more client computers 8A-8N. Furthermore, the processes for implementing CDP or snapshots for CDP may execute on any of these systems or may operate in a distributed fashion with components executing across two or more of these systems.

Figure 2:
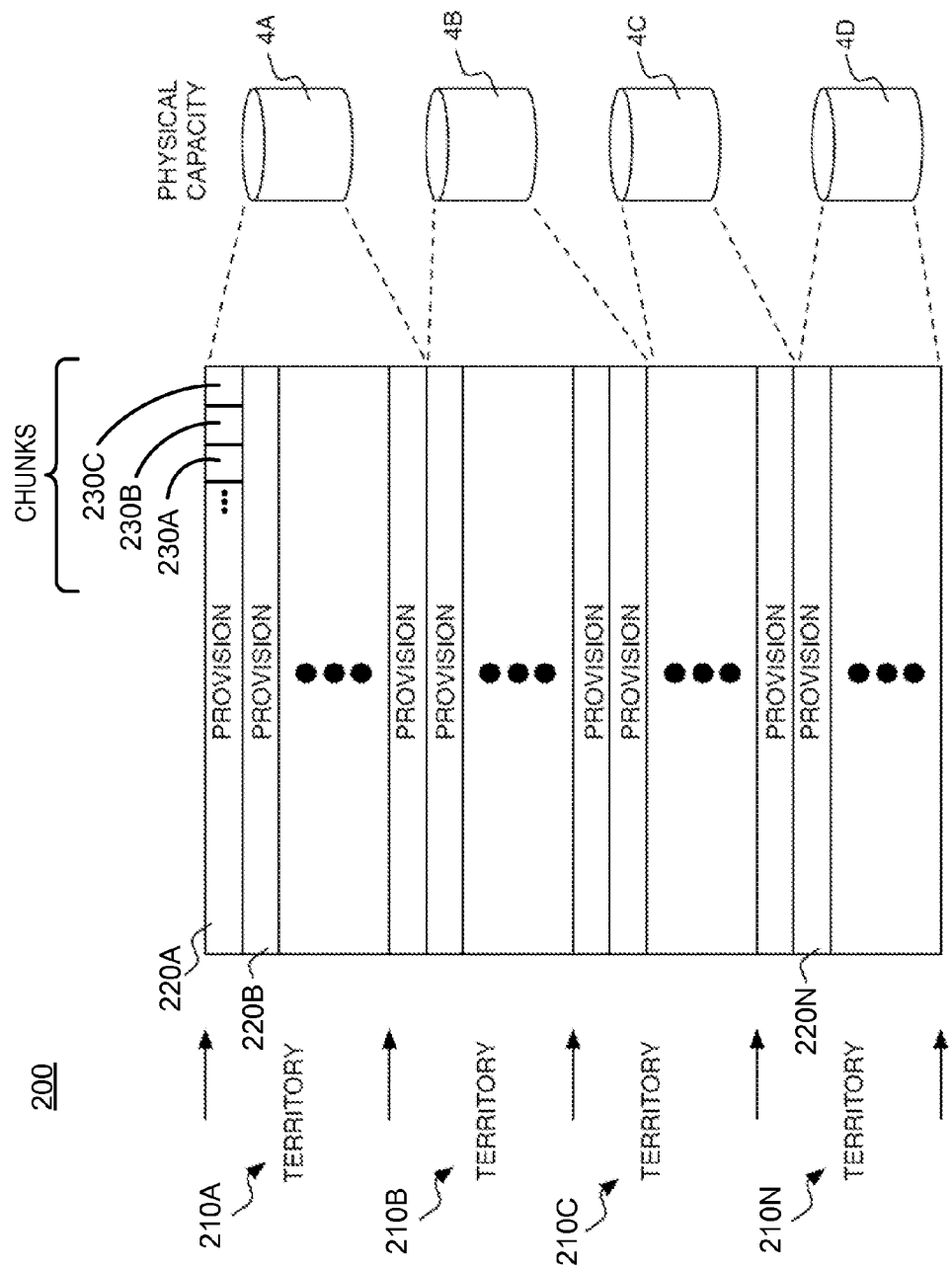
FIG. 2 is a block diagram illustrating the division of physical capacity within a data storage server into provisions and territories according to one exemplary embodiment.

Referring now to FIG. 2, a block diagram 200 illustrates division of the physical capacity within a storage server computer 2 into provisions 220A-220N and territories 210A-210N according to one exemplary embodiment. The available physical capacity of the computer 2 can be made up of a number of hard disk drives 4A-4D. It should be appreciated that other storage nodes connected to the computer 2 may also contribute physical capacity to the available physical capacity of the computer 2. The available physical capacity can be divided into a number of unique, equally sized areas, called territories 210A-210N. According to embodiments, the size of a territory may be a reduced size of 8 megabytes (MB). However, it should be appreciated that territories of other sizes may be utilized.

The available physical capacity may be further subdivided into units referred to herein as provisions 220A-220N. The provisions 220A-220N can comprise unique, equally sized areas of the available physical capacity. As one example, the provisions 220A-220N may be a reduced size of 512 kilobytes (KB). A 512 KB provision can support a reduction of the storage used upon creation of a snapshot by up to half, compared to a system using 1 MB provisions. It should be appreciated that provisions of other sizes may also be utilized.

A provision can be further subdivided into chunks 230A-230C. Chunk size can be specified at the time of volume creation. According to one embodiment, the chunk size can be selected as 64 KB, or a reduced size of 8 KB. Selecting an 8 KB chunk granularity can benefit volumes serving online transaction processing (OLTP) applications such as email or database systems. Such applications may often serve 8 KB random I/O operations. When a volume using 64 KB chunk granularity receives an 8 KB write to a snapshot, a wasteful series of operations may ensure. For example, a previous 64 KB chunk may have to be read, the appropriate 8 KB of new data modified, and finally the whole 64 KB chunk can be written to the new provision allocation. Alternatively, if the chunk granularity is the same size as the write (8 KB in the given example), then a single write may suffice and the read-modify-write (RMW) operation may be avoided.

A thin provisioning system can support provision tracking. Provision tracking is the ability to track "unused" and "written" portions of the storage space with very fine granularities so that snapshot actions may minimize wasted space. The size of a chunk 230A-230C can imply a chunk storage granularity for provision tracking. After a snapshot event, data writes may entail allocating a new provision 220A-220N for the new data to be written. Thus, for every chunk 230A-230C that was written in a previous snapshot lifetime and written anew in a subsequent snapshot lifetime, a new provision is allocated. The provision 220A-220N can be allocated at the reduced provision granularity 512 KB. A provision allocation involving a new territory can cause a territory to be allocated on demand. The territory allocation can be made at a reduced granularity of 8 MB. Once the provision 220A-220N is allocated, the new data write can be made to a chunk 230A-230C within the new provision 220A-220N. The chunk can be written at either a 64 KB granularity or a reduced 8 KB granularity. Thus, allocation of new physical storage space occurs at the territory granularity, for example the reduced 8 MB granularity. However, after a snapshot is created, write allocations can occur at the provision granularity, for example the reduced provision granularity of 512 KB.

Figure 3:
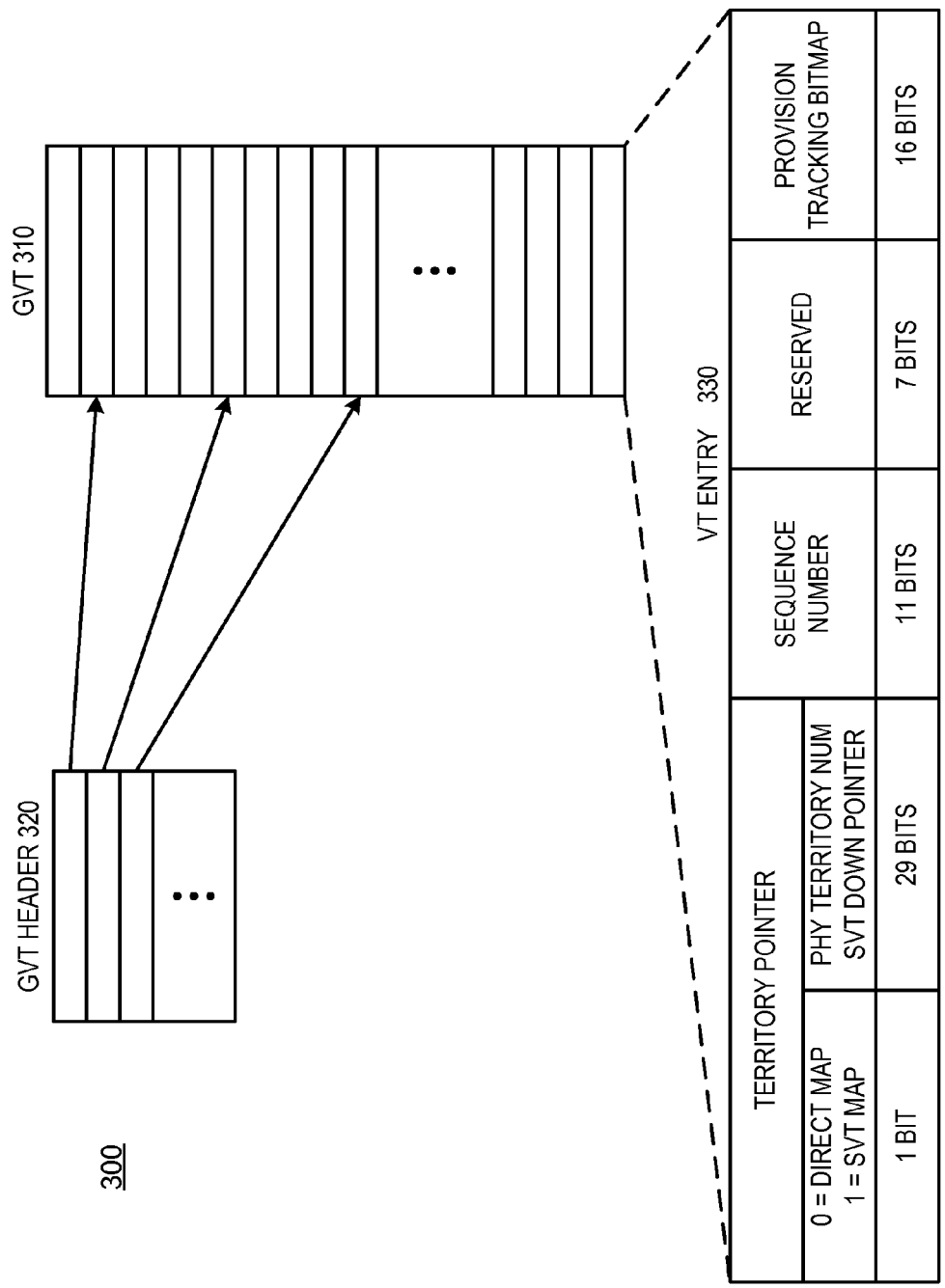
FIG. 3 is a data structure diagram illustrating a global volume table and a global volume table header according to one exemplary embodiment.

Turning now to FIG. 3, a data structure diagram 300 illustrates a global volume table 310 and a global volume table header 320 according to one exemplary embodiment. For a given storage volume, an array called a volume table (VT) can maintain a mapping of logical addresses to physical territories. The various volume tables for the various volumes within a data storage system can be stored together in a global volume table (GVT) 310. Each volume table within the GVT 310 can be specified by a pointer or offset into the GVT 310 where the respective VT begins.

The size of a given VT within the GVT 310 depends upon the size of the associated volume. As an example, a GVT can store 32 million VT entries. If each entry can support 8 MB, then 32 million entries can address up to 256 TB. According to this example, a 256 TB storage system with two volumes, each of size 128 TB, may be supported by two VTs within the GVT 310. Then first VT can map 16 million territories and the second VT can map the remaining 16 million territories.

A GVT header 320 structure can serve as an index of VTs within the GVT 310. An entry within the GVT header 320 can be associated with a given storage volume, and thus a VT. An entry in the GVT header 320 can specify the size of the associated VT and the offset of that VT within the GVT 310. The entry in the GVT header 320 can also specify whether the associated volume belongs to a container or not. According to one embodiment, if a storage container can support a maximum of 64 volumes, a GVT header 320 may be an array of 64 entries, one for each volume. It should be appreciated that a different number of possible volumes may be supported.

A volume table entry 330 is the element within a VT, and thus within a GVT 310. The VT entry 330 can map an 8 MB logical territory to an 8 MB physical territory, either directly or through another level of mapping. An example VT entry 330 can be eight bytes in length. An eight byte VT entry 330 can include a 30 bit territory pointer field, an 11 bit sequence number field for snapshots, 7 reserved bits, and a 16 bit provision tracking bitmap. The provision tracking bitmap can support tracking written and unwritten provisions directly within the VT. The size of the VT entry 330 and the fields within the VT entry 330 are only an example, the fields, the sizes of the fields, and the size of the VT entry 330 may differ from these examples.

The 30 bit territory pointer field may be further broken down as a 1 bit field and a 29 bit field. The 1 bit field can be used to indicate whether the address translation is one or two level. That is, this 1 bit field may indicate whether the entry directly points to a physical address or points indirectly through a system volume table (SVT) as discussed in further detail with respect to FIG. 5. The 29 bit field can store either a physical territory address or an SVT pointer depending upon the setting of the 1 bit field.

Figure 4:
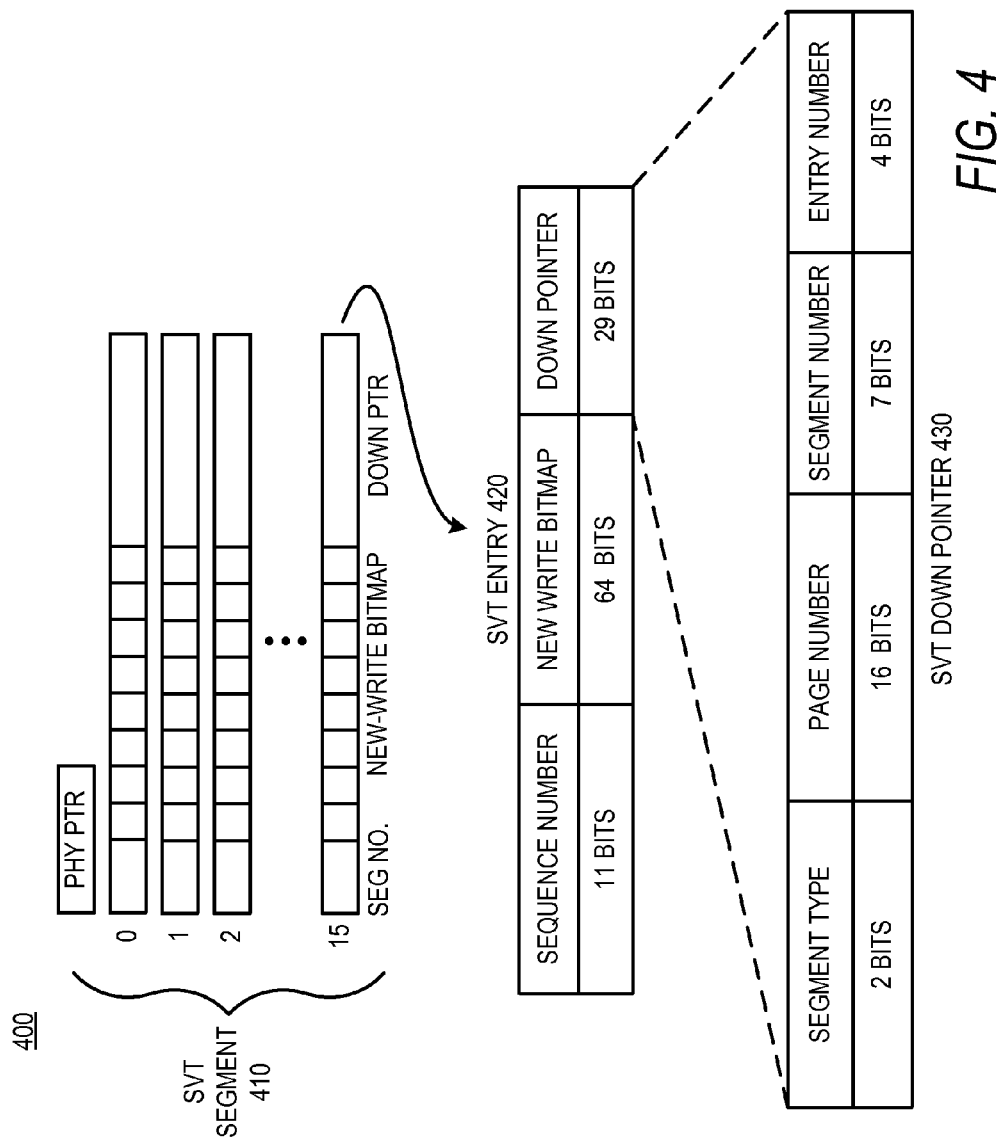
FIG. 4 is a data structure diagram illustrating a system volume table segment and system volume table entries according to one exemplary embodiment.

Turning now to FIG. 4, a data structure diagram 400 illustrates a system volume table segment 410 and system volume table entries 420 according to one exemplary embodiment. Volume tables (VT) alone, as discussed with respect to FIG. 3 may not resolve volumes with active snapshots. Volumes with active snapshots can have physical territories containing data from both current and previous snapshot lifetimes. In order to track the current lifetime (volume) location, an intermediate data structure can be used to provide accounting on a provision level. A system volume table (SVT) can serve as such a data structure. An SVT can link provisions belonging to the same address, but that also belonging to different snapshot lifetimes. An SVT can contain an SVT entry 420 for each provision in the system. According to examples discussed herein, a provision can store 512 KB. An SVT segment 410 can have 16 SVT entries 420 each addressing a 512 KB provision, thus totaling 8 MB (or one territory) per SVT entry 420. Other provision or territory sizes may also be supported.

An SVT entry 420 can store several pieces of information related to each provision. According to the illustrated example, an SVT entry 420 can store an 11 bit sequence number to specify the lifetime that the provision was allocated in, a 29 bit SVT down pointer 430, and a new writes bitmap. The new writes bitmap can contain 8 bits or 64 bits depending on whether the volume uses 64 KB chunks or 8 KB chunks. The smaller chunk size of 8 KB can divide a provision into more chucks, so more bits are required in the new writes bitmap to associate with each chunk. The new writes bitmap can provide a bit for each chunk within the provision. These bits can represent whether a particular chunk is valid within the provision or not. Thus, the bit indicates if a given provision has the relevant data written to it, or if an early lifetime snapshot is to be referenced to find the data. The SVT entry 420 can be six bytes for a 64 KB chunk volume, or 13 bytes for an 8 KB chunk volume.

An example SVT entry down pointer 430 can have 29 bits that can be again split into various fields. These fields of the SVT down pointer 430 can be a 2 bit segment type, a 16 bit page number, a 7 bit segment number, and a 4 bit entry number. The fields, and field lengths of the SVT entry 420 and the SVT down pointer 430 may differ from these nonlimiting examples. The SVT down pointer 430 can be used as a pointer to the next physical provision belonging to the same volume and with the same logical provision number. During a read, if the new writes bitmap is not set for the provision being sought, the SVT down pointer 420 can be used to traverse into the SVT until an SVT entry 420 is identified with the bit set indicating that it has data for that provision.

Figure 5:
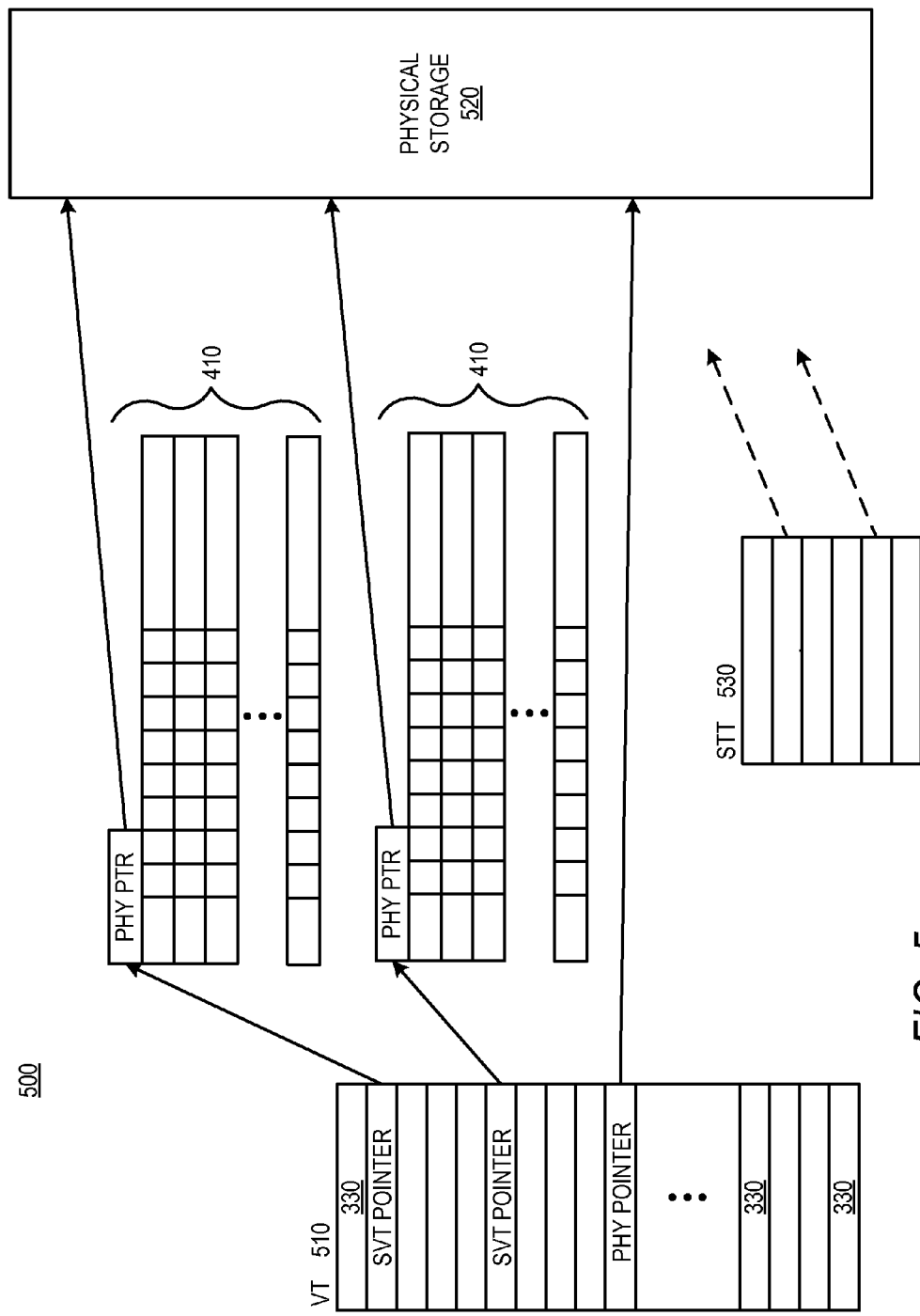
FIG. 5 is a data structure diagram illustrating a volume table mapping both directly into physical storage and indirectly via system volume table segments according to one exemplary embodiment.

Turning now to FIG. 5, a data structure diagram 500 illustrates a volume table 510 mapping both directly into a physical storage 520 and indirectly via system volume table segments 410 according to one exemplary embodiment. A volume table (VT) 510 can support directing I/O operations from a virtual address to a correct physical address either directly or indirectly. Data may be stored in a scattered fashion over one or more physical disks 4. Thin provisioning may be considered a mapping from a virtual address associated within a volume to a physical address associated with physical storage 520. The physical storage 520 can include one or more disks 4, or any other physical data storage media. As discussed with respect to FIG. 3, a VT 510 can be stored within a GVT 310 and can contain one or more VT entries 330.

As illustrated in FIG. 5, a VT entry 330 can point directly to physical storage 520. In such an instance, a virtual address can be used to index into the VT 510 and recover the information for accessing the physical storage 520. A VT entry 330 can also have an indirect relationship to the physical storage 520. In the indirect instance, the VT entry 330 may point to an SVT segment 410. The SVT segment 410 may, in turn, include a physical pointer, or addressing information, for accessing the physical storage 520. The SVT can be considered an intermediate structure, as it is mapped between the VT and the physical storage 520. Each VT entry 330 can directly, or indirectly, address one territory. In an example discussed with respect to FIG. 2, a territory can store 8 MB of storage capacity. In an indirect addressing instance, the SVT segment 410 associated with the VT entry 330 can have 16 SVT entries 420 each addressing 512 KB. Each SVT segment 410 can include a 31 bit physical territory pointer along with a 1 bit flag to specify if the segment is free.

As discussed with respect to FIG. 3, the volume table entry 330 can directly track unwritten provisions. This can be used when the VT entry 330 directly points to physical storage 520. However, such mapping may not support snapshots. Thus, a territory involving snapshots can use indirect addressing from a VT entry 330 via an SVT segment 410. Territories that have been allocated for snapshots can also be tracked by a data structure similar to a volume table, called a snapshot territory table (STT) 530. A separate STT 530 can be maintained for each storage container. The STT 530 can be stored to disk independently from the GVT 310.

According to one embodiment, the SVT may be limited to 300 MB to maintain efficient use of memory within the storage server 2. SVT segments 410 can be allocated in 8 KB blocks called aligned SVT segments as needed. The allocation can cease if the SVT space reaches the 300 MB limit. After the 300 MB limit is reached, VT entries 330 may no longer indirectly map through an SVT and may directly map to the physical storage 520. In this instance, snapshots may no longer be supported in association with the volume.

Figure 6:
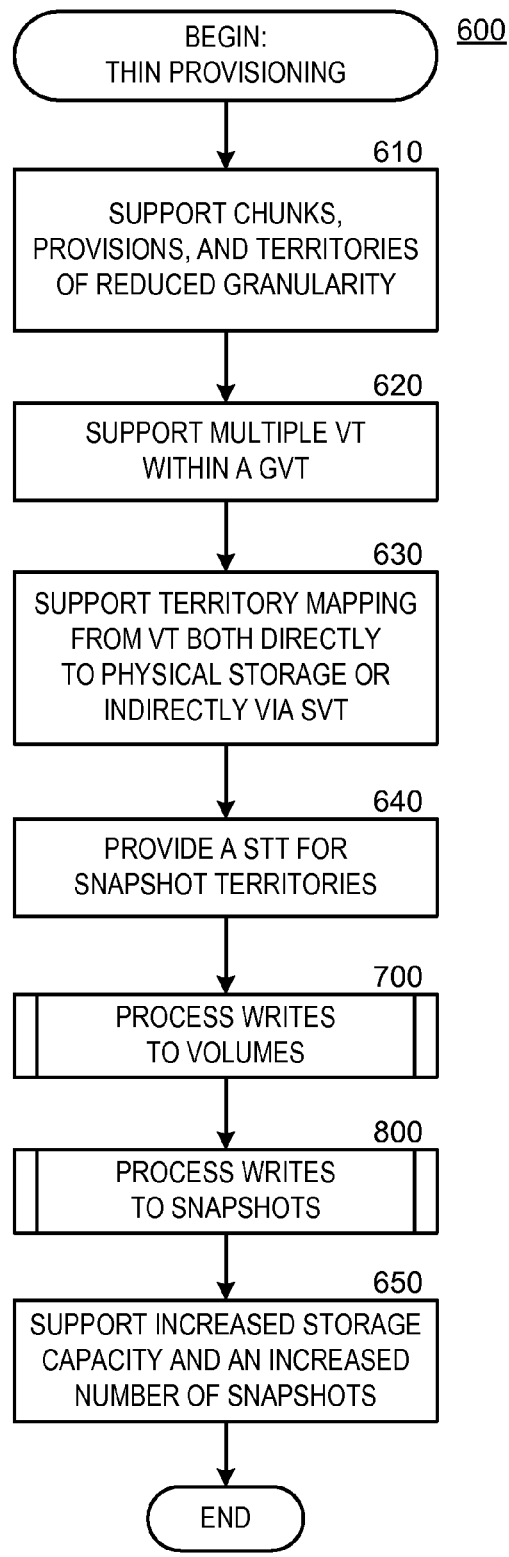
FIG. 6 is a logical flow diagram illustrating a process for providing thin provisioning in a high capacity data storage system according to one exemplary embodiment.

Turning now to FIG. 6, additional details will be provided regarding the embodiments presented herein for large capacity storage servers with thin provisioning, snapshots, and reduced memory footprints. In particular, FIG. 6 is a flow diagram showing a routine 600 that illustrates aspects of a process for providing thin provisioning in a high capacity data storage system according to one exemplary embodiment. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

The routine 600 can begin with operation 610 where chunks, provisions, and territories having reduced granularity sizes may be supported. As discussed with respect to FIG. 2, examples of reduced granularities can include territory allocations of 8 MB, provisions of 512 KB, and chunks of either 64 KB or 8 KB. Other sizes or combinations of sizes may also be used. Reduced allocation granularities can support more efficient storage system operations and reduction in wasted space during various storage operations.

At operation 620, a global volume table (GVT) 310 can be provided for storing and organizing one or more volume tables (VT). At operation 630, territory mapping from a VT can be supported in two ways. First, territories may be mapped from the VT, or GVT 310, directly to physical storage. Alternatively, territories may be mapped from the VT, or GVT 310, indirectly via a system volume table segment (SVT segment) 410. This flexibility can support the bypassing of an SVT when snapshots are not being used in a given volume. Thus, the memory that may have been used to maintain the unused SVT entries can be more efficiently used for some other function.

At operations 640, a snapshot territory table (STT) 530 can be provided for tracking territories that have been allocated to snapshots. Routine 700 can support processing write operations to storage volumes. Additional details related to routine 700 are discussed with respect to FIG. 7. Routine 800 can support processing write operations to storage snapshots. Additional details related to routine 800 are discussed with respect to FIG. 8.

At operation 650, increased storage capacity and an increased number of snapshots can be supported. Through technologies discussed herein, a huge number of volumes and a very large capacity of storage may be supported. For example, thousands of snapshots and 256 TB, or more, of total capacity. These technologies can be implemented with a minimum impact on CPU and memory resources within the storage server 2 while maintaining a very high level of system performance.

Figure 7:
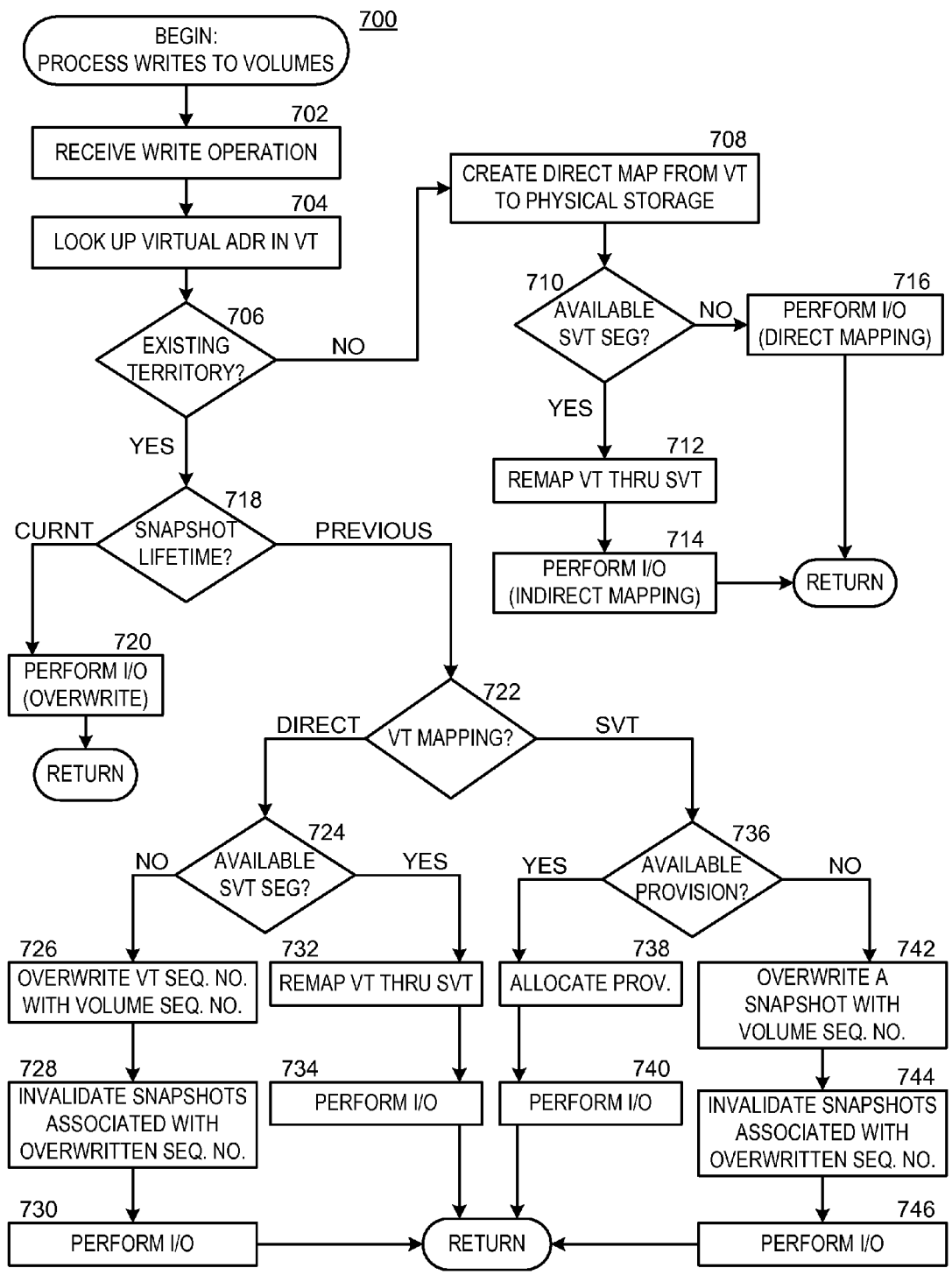
FIG. 7 is a logical flow diagram illustrating a process for handling writes to data volumes according to one exemplary embodiment.

Turning now to FIG. 7, additional details will be provided regarding the embodiments presented herein for large capacity storage servers with thin provisioning, snapshots, and reduced memory footprints. In particular, FIG. 7 is a flow diagram illustrating a routine 700 that shows aspects of a process for handling writes to data volumes according to one exemplary embodiment. The routine 700 can begin with operation 702 where a write operation is received for a storage volume. In operation 704, a lookup is performed at the corresponding VT entry 330. At operation 706, it is determined if a valid territory pointer exists in the VT entry 330.

If it is determined at operation 706 that there is not a valid territory pointer in the VT entry 330 corresponding to the write address, the routine 700 can continue to operation 708 to handle a first write arriving to that 8 MB territory associated with the write operation received at operation 702. A direct mapping to the new territory can be established by populating the VT entry 330 with a pointer to the physical territory within the physical storage 520. At operation 710, it is determined if an SVT segment 410 is available for converting the physical pointer to an indirect pointer. If no free SVT segment 410 is available, the routine 700 can transition to operation 716 where the write request can be satisfied to the territory with a direct mapping from the VT entry 330. The routine 700 can return after the write I/O is performed in operation 716.

If it is determined in operation 710 that a free SVT segment 410 is available, the routine can continue to operation 712 where the direct mapping created in operation 708 can be converted to an indirect mapping. This conversion can occur by redirecting the pointer in the VT entry 330 to a newly allocated SVT segment 410 and then pointing the SVT segment 410 to the physical storage 520. Effectively, the SVT segment 410 is inserted between the VT entry 330 and the physical storage 520 as illustrated in FIG. 5. At operation 714, the write I/O received at operation 702 can be satisfied to the new indirectly addressed physical storage 520. The routine 700 can return after the write I/O is performed in operation 714.

If it is determined at operation 706 that a valid territory pointer exists in the VT entry 330 corresponding to the write operation, the routine 700 can continue to operation 718 where it can be determined if the snapshot lifetime associated with the existing territory is for the current lifetime or a previous snapshot. This can be determined, for example, by comparing the sequence number in the VT entry 330 with the sequence number of the current volume.

If it is determined at operation 718 that the snapshot lifetime associated with the existing territory is for the current lifetime (generally referred to as the volume) then the write operation can be performed in the existing provision. As such, the routine 700 can continue to operation 720 where the write I/O received at operation 702 can be satisfied to the current provision by overwriting the existing data. This overwrite may be acceptable since the provision is in the current lifetime so no snapshot was created between the overwritten data and the data being written presently. This write can occur either directly or indirectly through an SVT segment 410 as determined by the pointer in the VT entry 330 that was identified in operation 704. The routine 700 can return after the write I/O is performed in operation 720.

If it is determined at operation 718 that the snapshot lifetime associated with the existing territory is for a previous lifetime (generally referred to as a previous snapshot) then new storage can be allocated to preserve the data stored in the previous lifetime as a snapshot provision. Such techniques for preserving data from previous snapshots from being overwritten may be dictated by the operation of the snapshot management mechanism within the storage server 2. As such, the routine 700 can proceed to operation 722 where it can be determined if the VT mapping is direct to a physical storage 520 or indirect via an SVT entry 330.

If it is determined at operation 722 that the VT mapping is direct to a physical storage 520, it may be desirable to reroute the direct mapping through a newly allocated SVT segment 410. Thus, the routine 700 can continue to operation 724 where it can be determined if a free SVT segment 410 is available for converting the physical pointer to an indirect pointer. If it is determined at operation 724 that no free SVT segments 410 are available, the routine 700 can transition to operation 726 where the sequence number in the VT entry 330 is overwritten to the sequence number of the current volume. This operation can take the territory that was being used by a previous snapshot and reuse it for the current volume which can take priority. In operation 728, snapshots associated with the sequence number overwritten in operation 726 are invalidated. This may be done because the snapshots in question may become flawed by the loss of the territory that was repurposed in operation 726. At operation 730, the write I/O received at operation 702 can be satisfied to the repurposed territory. The routine 700 can return after the write I/O is performed in operation 730.

If it is determined in operation 724 that a free SVT segment 410 is available, the routine can continue to operation 732 where the direct mapping of the territory can be converted to an indirect mapping. This conversion can occur by redirecting the pointer in the VT entry 330 to a newly allocated SVT segment 410 and then pointing the SVT segment 410 to the physical storage 520. Effectively, the SVT segment 410 is inserted between the VT entry 330 and the physical storage 520 as illustrated in FIG. 5. At operation 734, the write I/O received at operation 702 can be satisfied to the new indirectly addressed physical storage 520. The routine 700 can return after the write I/O is performed in operation 734.

If it is determined at operation 722 that the VT mapping is indirect via an SVT entry 330, a new provision within the SVT segment 410 may be allocated if available. Thus, the routine 700 can continue to operation 736 where it can be determined if there is an available provision for allocation.

If it is determined at operation 736 that a provision is available for allocation, the routine 700 may continue to operation 738 where a new provision is allocated. In operation 740, the write I/O received at operation 702 can be satisfied to the newly allocated provision from operation 738. The routine 700 can return after the write I/O is performed in operation 740.

If it is determined at operation 736 that a provision is not available for allocation, the routine 700 may continue to operation 742 where a previous snapshot provision may be overwritten. The sequence number of a previous entry within the chain of the SVT can be overwritten to the current volume sequence number. This operation can take the provision that was being used by a previous snapshot and reuse it for the current volume which can take priority. In operation 744, snapshots associated with the sequence number overwritten in operation 742 are invalidated. This may be done because the snapshots in question may become flawed by the loss of the territory that was repurposed in operation 742. At operation 746, the write I/O received at operation 702 can be satisfied to the repurposed provision. The routine 700 can return after the write I/O is performed in operation 746. It should be appreciated then when a snapshot is overwritten in operation 742, the SVT segment 410 can be traversed to find a writable snapshot to be overwritten. If no writeable snapshot is identified, a read-only snapshot may be overwritten. As discussed, snapshots that rely on the particular overwritten sequence number are marked as invalid. A background monitoring service may receive a notification of invalidated snapshots. The background monitoring service can then delete the invalidated snapshot to reclaim the snapshot provision space.

Figure 8:
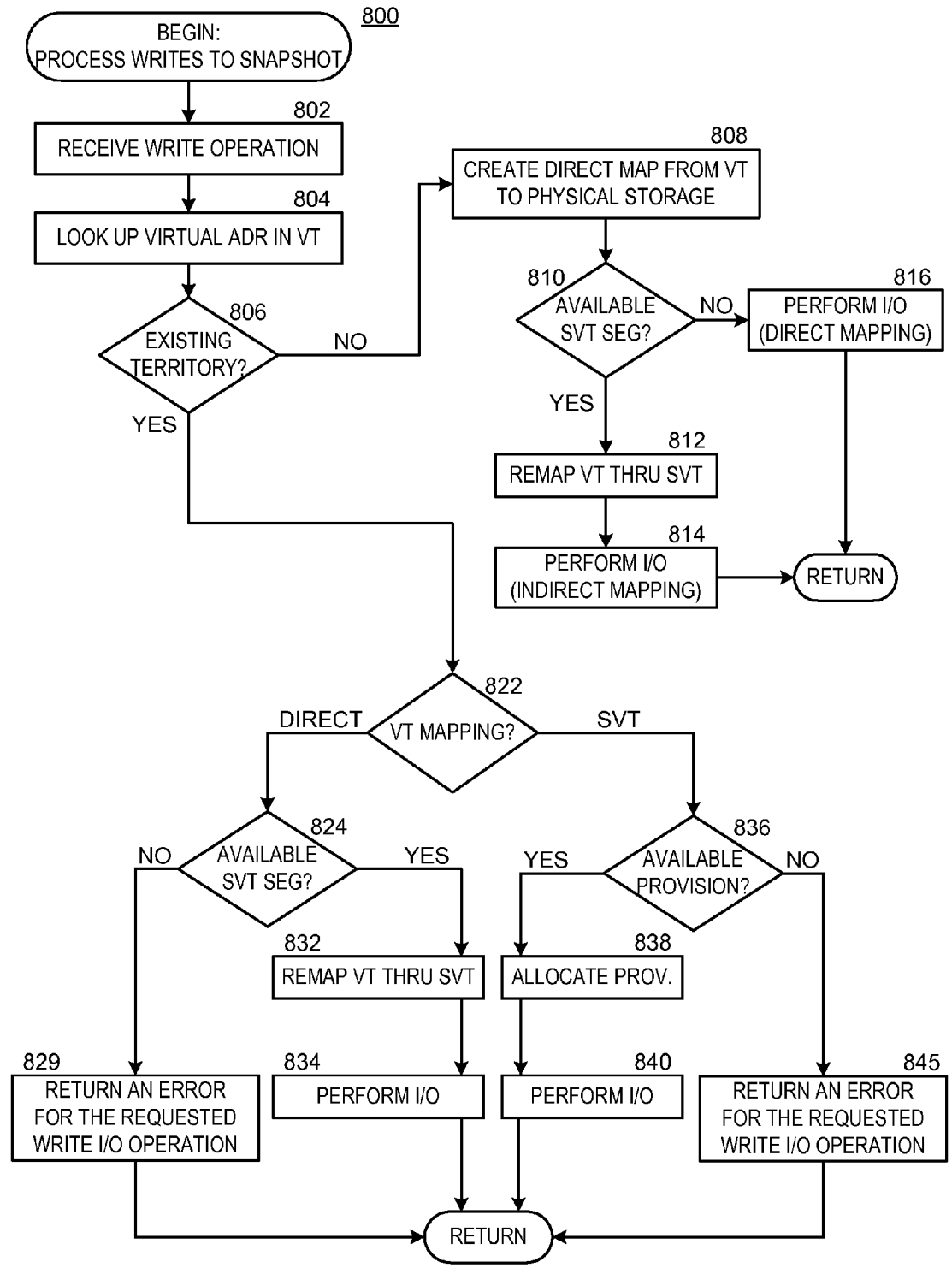
FIG. 8 is a logical flow diagram illustrating a process for handling writes to snapshots according to one exemplary embodiment.

Turning now to FIG. 8, additional details will be provided regarding the embodiments presented herein for large capacity storage servers with thin provisioning, snapshots, and reduced memory footprints. In particular, FIG. 8 is a flow diagram illustrating a routine 800 that shows aspects of a process for handling writes to snapshots according to one exemplary embodiment. The routine 800 can begin with operation 802 where a write operation is received for a storage snapshot. In operation 804, a lookup is performed at the corresponding VT entry 330. At operation 806, it is determined if a valid territory pointer exists in the VT entry 330.

If it is determined at operation 806 that there is not a valid territory pointer in the VT entry 330 corresponding to the write address, the routine 800 can continue to operation 808 to handle a first write arriving to that 8 MB territory associated with the write operation received at operation 802. A direct mapping to the new territory can be established by populating the VT entry 330 with a pointer to the physical territory within the physical storage 520. At operation 810, it can be determined if an SVT segment 410 is available for converting the physical pointer within the VT to an indirect pointer. If no free SVT segment 410 is available, the routine 800 can transition to operation 816 where the write request can be satisfied to the territory with a direct mapping from the VT entry 330. The routine 800 can return after the write I/O is performed in operation 816.

If it is determined in operation 810 that a free SVT segment 410 is available, the routine 800 can continue to operation 812 where the direct mapping created in operation 808 can be converted to an indirect mapping. This conversion can occur by redirecting the pointer in the VT entry 330 to a newly allocated SVT segment 410 and then pointing the SVT segment 410 to the physical storage 520. Effectively, the SVT segment 410 can be inserted between the VT entry 330 and the physical storage 520 as illustrated in FIG. 5. At operation 814, the write I/O received at operation 702 can be satisfied to the new indirectly addressed physical storage 520. The routine 800 can return after the write I/O is performed in operation 814.

If it is determined at operation 806 that a valid territory pointer exists in the VT entry 330 corresponding to the write operation, the routine 800 can continue to operation 822 where it can be determined if the VT mapping is direct to a physical storage 520 or indirect via an SVT entry 330.

If it is determined at operation 822 that the VT mapping is direct to a physical storage 520, it may be desirable to reroute the direct mapping through a newly allocated SVT segment 410. Thus, the routine 800 can continue to operation 824 where it can be determined if a free SVT segment 410 is available for converting the physical pointer to an indirect pointer. If it is determined at operation 824 that no free SVT segments 410 are available, the routine 800 can transition to operation 829 where a failure error is returned for the write I/O request received at operation 802. The routine 800 can return after the error message is generated in operation 829.

If it is determined in operation 824 that a free SVT segment 410 is available, the routine can continue to operation 832 where the direct mapping of the territory can be converted to an indirect mapping. This conversion can occur by redirecting the pointer in the VT entry 330 to a newly allocated SVT segment 410 and then pointing the SVT segment 410 to the physical storage 520. Effectively, the SVT segment 410 is inserted between the VT entry 330 and the physical storage 520 as illustrated in FIG. 5. At operation 834, the write I/O received at operation 802 can be satisfied to the new indirectly addressed physical storage 520. The routine 800 can return after the write I/O is performed in operation 834.

If it is determined at operation 822 that the VT mapping is indirect via an SVT entry 330, a new provision within the SVT segment 410 may be allocated if available. Thus, the routine 800 can continue to operation 836 where it can be determined if there is an available provision for allocation.

If it is determined at operation 836 that a provision is available for allocation, the routine 800 may continue to operation 838 where a new provision is allocated. In operation 840, the write I/O received at operation 802 can be satisfied to the newly allocated provision from operation 838. The routine 800 can return after the write I/O is performed in operation 840.

If it is determined at operation 836 that a provision is not available for allocation, the routine 800 may continue to operation 845 where a failure error is returned for the write I/O request received at operation 802. The routine 800 can return after the error message is generated in operation 845.

It should be appreciated that a significant difference between processing volume writes, as discussed with respect to FIG. 7, and processing snapshot writes, as discussed with respect to FIG. 8, is the handling of allocation failures. In the snapshot case, failure to allocate an SVT segment 410 or failure to allocate a provision can result in the I/O operation failing, while a previous snapshot can be overwritten to accommodate the write in the case of a volume write. This difference may be due to a volume write representing a write to the current state of a storage volume and thus may be provided priority over previous snapshots. In contrast, there is no default reason to overwrite one snapshot for another snapshot and generally it would not be desirable to risk loss of a volume for the sake of a write to a previous snapshot.

Figure 9:
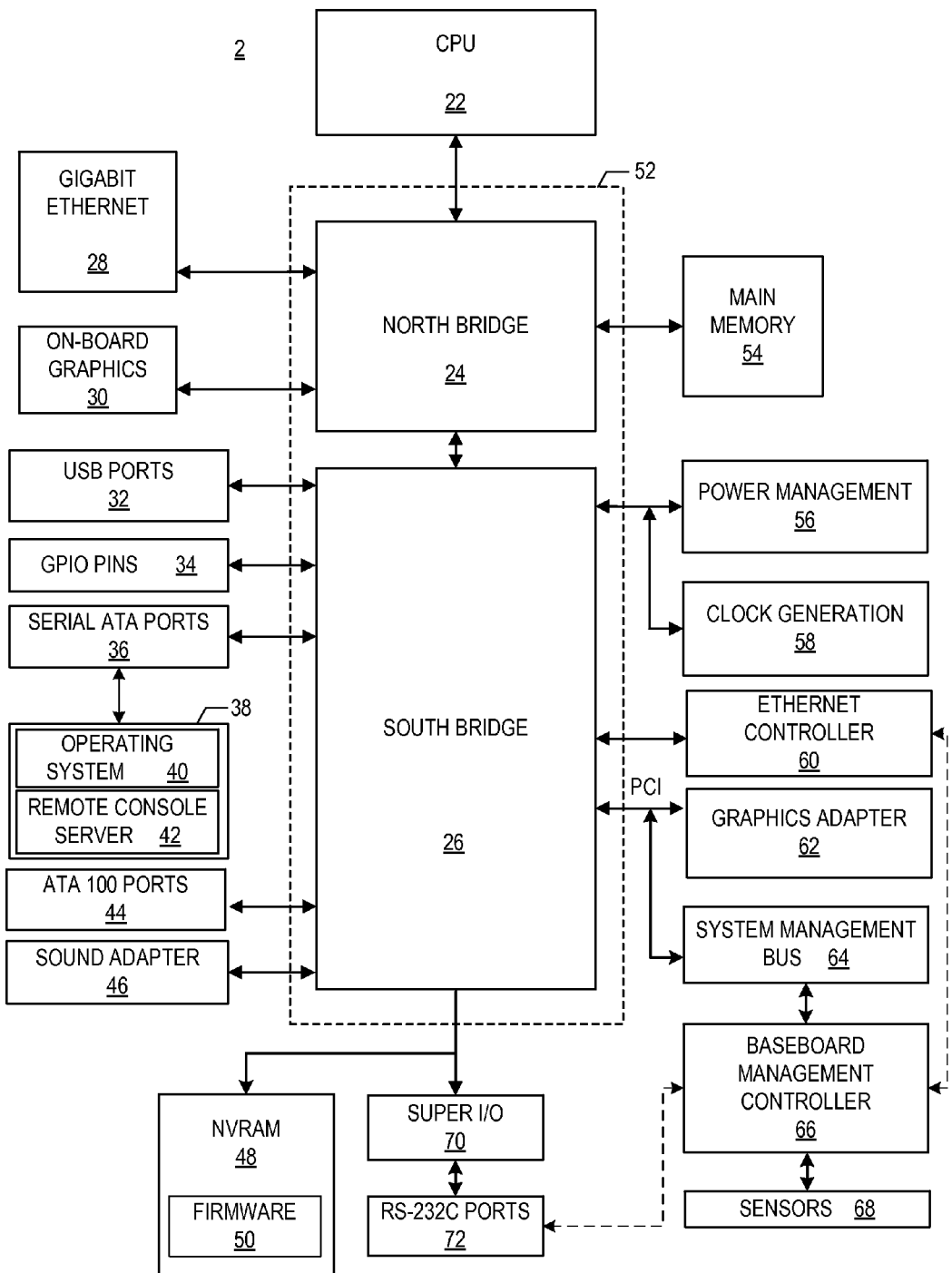
FIG. 9 is a computer architecture diagram illustrating a computer hardware architecture for a computing system capable of high capacity data storage.

FIG. 9 and the following discussion are intended to provide a brief, general description of a suitable computing environment in which the embodiments described herein may be implemented. While the technical details are presented herein in the general context of program modules that execute in conjunction with the execution of an operating system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

In particular, FIG. 9 shows an illustrative computer architecture for a storage server computer 2 that may be utilized in the implementations described herein. Such an illustrative computer system may also describe a client computer system 8A-8N. The storage node computer 2 includes a baseboard, or "motherboard", which is a printed circuit board to which a multitude of components or devices may be connected by way of a system bus or other electrical communication paths. In one illustrative embodiment, a CPU 22 operates in conjunction with a chipset 52. The CPU 22 is a standard central processor that performs arithmetic and logical operations necessary for the operation of the computer. The storage node computer 2 may include a multitude of CPUs 22.

The chipset 52 includes a north bridge 24 and a south bridge 26. The north bridge 24 provides an interface between the CPU 22 and the remainder of the computer 2. The north bridge 24 also provides an interface to a random access memory ("RAM") used as the main memory 54 in the computer 2 and, possibly, to an on-board graphics adapter 30. The north bridge 24 may also include functionality for providing networking functionality through a gigabit Ethernet adapter 28. The gigabit Ethernet adapter 28 is capable of connecting the computer 2 to another computer via a network. Connections which may be made by the network adapter 28 may include LAN or WAN connections. LAN and WAN networking environments are commonplace in offices, enterprise-wide computer networks, intranets, and the internet. The north bridge 24 is connected to the south bridge 26.

The south bridge 26 is responsible for controlling many of the input/output functions of the computer 2. In particular, the south bridge 26 may provide one or more universal serial bus ("USB") ports 32, a sound adapter 46, an Ethernet controller 60, and one or more general purpose input/output ("GPIO") pins 34. The south bridge 26 may also provide a bus for interfacing peripheral card devices such as a graphics adapter 62. In one embodiment, the bus comprises a peripheral component interconnect ("PCI") bus. The south bridge 26 may also provide a system management bus 64 for use in managing the various components of the computer 2. Additional details regarding the operation of the system management bus 64 and its connected components are provided below.

The south bridge 26 is also operative to provide one or more interfaces for connecting mass storage devices to the computer 2. For instance, according to an embodiment, the south bridge 26 includes a serial advanced technology attachment ("SATA") adapter for providing one or more serial ATA ports 36 and an ATA 100 adapter for providing one or more ATA 100 ports 44. The serial ATA ports 36 and the ATA 100 ports 44 may be, in turn, connected to one or more mass storage devices storing an operating system 40 and application programs, such as the SATA disk drive 38. As known to those skilled in the art, an operating system 40 comprises a set of programs that control operations of a computer and allocation of resources. An application program is software that runs on top of the operating system software, or other runtime environment, and uses computer resources to perform application specific tasks desired by the user.

According to one embodiment of the invention, the operating system 40 comprises the LINUX operating system. According to another embodiment of the invention the operating system 40 comprises the WINDOWS SERVER operating system from MICROSOFT CORPORATION. According to another embodiment, the operating system 40 comprises the UNIX or SOLARIS operating system. It should be appreciated that other operating systems may also be utilized.

The mass storage devices connected to the south bridge 26, and their associated computer-readable media, provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the south bridge 6 for connecting a "Super I/O" device 70. The Super I/O device 70 is responsible for providing a number of input/output ports, including a keyboard port, a mouse port, a serial interface 72, a parallel port, and other types of input/output ports. The LPC interface may also connect a computer storage media such as a ROM or a flash memory such as a NVRAM 48 for storing the firmware 50 that includes program code containing the basic routines that help to start up the computer 2 and to transfer information between elements within the computer 2.

As described briefly above, the south bridge 26 may include a system management bus 64. The system management bus 64 may include a BMC 66. In general, the BMC 66 is a microcontroller that monitors operation of the computer system 2. In a more specific embodiment, the BMC 66 monitors health-related aspects associated with the computer system 2, such as, but not limited to, the temperature of one or more components of the computer system 2, speed of rotational components (e.g., spindle motor, CPU Fan, etc.) within the system, the voltage across or applied to one or more components within the system 2, and the available or used capacity of memory devices within the system 2. To accomplish these monitoring functions, the BMC 66 is communicatively connected to one or more components by way of the management bus 64. In an embodiment, these components include sensor devices for measuring various operating and performance-related parameters within the computer system 2. The sensor devices may be either hardware or software based components configured or programmed to measure or detect one or more of the various operating and performance-related parameters. The BMC 66 functions as the master on the management bus 64 in most circumstances, but may also function as either a master or a slave in other circumstances. Each of the various components communicatively connected to the BMC 66 by way of the management bus 64 is addressed using a slave address. The management bus 64 is used by the BMC 66 to request and/or receive various operating and performance-related parameters from one or more components, which are also communicatively connected to the management bus 64.

It should be appreciated that the computer 2 may comprise other types of computing devices, including hand-held computers, embedded computer systems, personal digital assistants, and other types of computing devices known to those skilled in the art. It is also contemplated that the computer 2 may not include all of the components shown in FIG. 9, may include other components that are not explicitly shown in FIG. 9, or may utilize an architecture completely different than that shown in FIG. 9.

Based on the foregoing, it should be appreciated that technologies for large capacity storage servers with thin provisioning, snapshots, and reduced memory footprints are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for thin provisioning in a high capacity data storage system, the method comprising:
   providing a volume table for mapping a virtual address to a physical address;
   providing an intermediate table for tracking snapshot provisions;
   supporting a direct mapping from the volume table to a physical storage device;
   supporting an indirect mapping from the volume table to the intermediate table and from the intermediate table to the physical storage device; and
   storing an indicator within a respective volume table mapping to specify if the mapping is direct or indirect.

2. The method of claim 1, further comprising converting the direct mapping into the indirect mapping in response to receiving a write operation to an address supporting data from a previous snapshot lifetime.

3. The method of claim 1, wherein respective entries within the volume table comprise a data field to support provision tracking.

4. The method of claim 1, further comprising providing a global volume table for storing multiple volume tables within the data storage system.

5. The method of claim 4, further comprising providing a header for indexing volume tables within the global volume table.

6. The method of claim 1, further comprising supporting a reduced provision chunk size equal to a size of a storage request associated with an online transaction processor.

7. The method of claim 1, further comprising providing a snapshot table for storing one or more mappings associated with a snapshot.

8. A computer storage medium having computer-executable instructions stored thereon which, when executed by a computer system, cause the computer system to:
   provide a volume table for mapping a virtual address to a physical address;
   provide an intermediate table for tracking snapshot provisions;
   support a direct mapping from the volume table to a physical storage device;
   support an indirect mapping from the volume table to the intermediate table and from the intermediate table to the physical storage device; and
   associate an indicator to a respective volume table mapping for specifying if the mapping is direct or indirect.

9. The computer storage medium of claim 8, further comprising causing the computer system to convert the direct mapping into the indirect mapping in response to receiving a write operation to an address supporting data from a previous snapshot lifetime.

10. The computer storage medium of claim 8, wherein respective entries within the volume table comprise a data field to support provision tracking.

11. The computer storage medium of claim 8, further comprising causing the computer system to provide a global volume table for storing multiple volume tables within the data storage system.

12. The computer storage medium of claim 11, further comprising causing the computer system to provide a header for indexing volume tables within the global volume table.

13. The computer storage medium of claim 8, further comprising causing the computer system to support a reduced provision chunk size equal to a size of a storage request associated with an online transaction processor.

14. The computer storage medium of claim 8, further comprising causing the computer system to provide a snapshot table for storing one or more mappings associated with a snapshot.

15. A data storage system comprising:
   a storage server;
   a physical storage device associated with storage server;
   a processing unit associated with the storage server;
   and one or more modules for execution on the processing unit, operable to provide a volume table for mapping a virtual address to a physical address, provide an intermediate table for tracking snapshot provisions, support a direct mapping from the volume table to the physical storage device, and support an indirect mapping from the volume table to the intermediate table and from the intermediate table to the physical storage device.

16. The data storage system of claim 15, wherein the one or more modules for execution on the processing unit are further operable to associate an indicator to each volume table mapping for specifying if the mapping is direct or indirect.

17. The data storage system of claim 15, wherein the one or more modules for execution on the processing unit are further operable to convert the direct mapping into the indirect mapping in response to receiving a write operation to an address supporting data from a previous snapshot lifetime.

18. The data storage system of claim 15, wherein respective entries within the volume table comprise a data field to support provision tracking.

19. The data storage system of claim 15, wherein the one or more modules for execution on the processing unit are further operable to provide a global volume table for storing multiple volume tables within the data storage system.

20. The data storage system of claim 15, wherein the one or more modules for execution on the processing unit are further operable to support a reduced provision chunk size equal to a size of a storage request associated with an online transaction processor.

* * * * *